United States Patent
Shahar

(10) Patent No.: US 10,264,597 B2
(45) Date of Patent: Apr. 16, 2019

(54) METHOD AND SYSTEM FOR BEST EFFORT SCHEDULING FOR A POINT TO MULTIPOINT BROADBAND WIRELESS SYSTEM

(71) Applicant: Full Spectrum Inc., Sunnyvale, CA (US)

(72) Inventor: Menashe Shahar, Los Altos, CA (US)

(73) Assignee: ONDAS NETWORKS INC., Sunnyvale, CA (US)

( * ) Notice: Subject to any disclaimer, the term of this patent is extended or adjusted under 35 U.S.C. 154(b) by 208 days.

(21) Appl. No.: 15/211,836

(22) Filed: Jul. 15, 2016

(65) Prior Publication Data

US 2017/0019902 A1    Jan. 19, 2017

Related U.S. Application Data

(60) Provisional application No. 62/193,688, filed on Jul. 17, 2015.

(51) Int. Cl.
*H04W 72/12* (2009.01)

(52) U.S. Cl.
CPC .............................. *H04W 72/1268* (2013.01)

(58) Field of Classification Search
CPC ... H04W 24/00; H04W 28/065; H04W 28/14; H04W 4/04; H04W 72/042; H04W 72/1205; H04W 72/1273; H04W 72/0413; H04W 72/121; H04W 72/1289; H04W 74/006; H04W 74/0891; H04W 84/12; H04W 72/0453; H04W 72/04; H04W 88/08; H04W 72/082; H04W 72/0406; H04W 72/0446; H04W 72/048; H04W 84/045; H04W 24/02; H04W 72/005; H04W 72/0466; H04W 88/04; H04W 24/08; H04W 28/06; H04W 52/243; H04W 72/0486

USPC ...................................................... 370/329
See application file for complete search history.

(56) References Cited

U.S. PATENT DOCUMENTS

| | | | |
|---|---|---|---|
| 2010/0202310 A1* | 8/2010 | Lee ...................... | H04L 47/788 370/252 |
| 2014/0161108 A1* | 6/2014 | Lohr ..................... | H04L 5/0007 370/336 |
| 2016/0135214 A1* | 5/2016 | Chendamarai Kannan et al. ....... | H04L 5/14 370/280 |

* cited by examiner

*Primary Examiner* — Natasha W Cosme
(74) *Attorney, Agent, or Firm* — Pearl Cohen Zedek Latzer Baratz LLP

(57) ABSTRACT

A system and method for best effort scheduling of uplink bandwidth requests, in which aggregate uplink bandwidth requests for best efforts services are received from the remote stations, the base station calculates bulk bandwidth, and the remote stations distribute bulk bandwidth to the requesting services.

15 Claims, 3 Drawing Sheets

METHOD AND SYSTEM FOR BEST EFFORT SCHEDULING FOR A POINT TO MULTIPOINT BROADBAND WIRELESS SYSTEM

CROSS-REFERENCE TO RELATED APPLICAITONS

This application claims priority from U.S. Provisional Patent Application No. 62/193,688, filed Jul. 17, 2015, which is incorporated herein by reference.

FIELD OF THE INVENTION

The present invention relates generally to Point to Multipoint Broadband Wireless networks, and in particular to scheduling of uplink transmissions, i.e., transmission from remote stations to a base station.

BACKGROUND OF THE INVENTION

Base stations and remote stations may be in communication among each other via a network, including a wireless network. Such a network may be comprised of one or more base stations and one or more remote stations. A Point to Multipoint (PtMP) Broadband Wireless System may consist of at least one base station (BS) and a plurality of remote stations (RSs), which may be fixed or mobile. Two-way communication (downlink and uplink) may be established between a BS and any RS in its geographic sector. In the uplink direction, the BS allocates uplink bandwidth for use by each RS, which may be based on a request for uplink bandwidth by each RS. A BS may have a need to efficiently and fairly allocate limited uplink bandwidth resources among its associated RSs.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
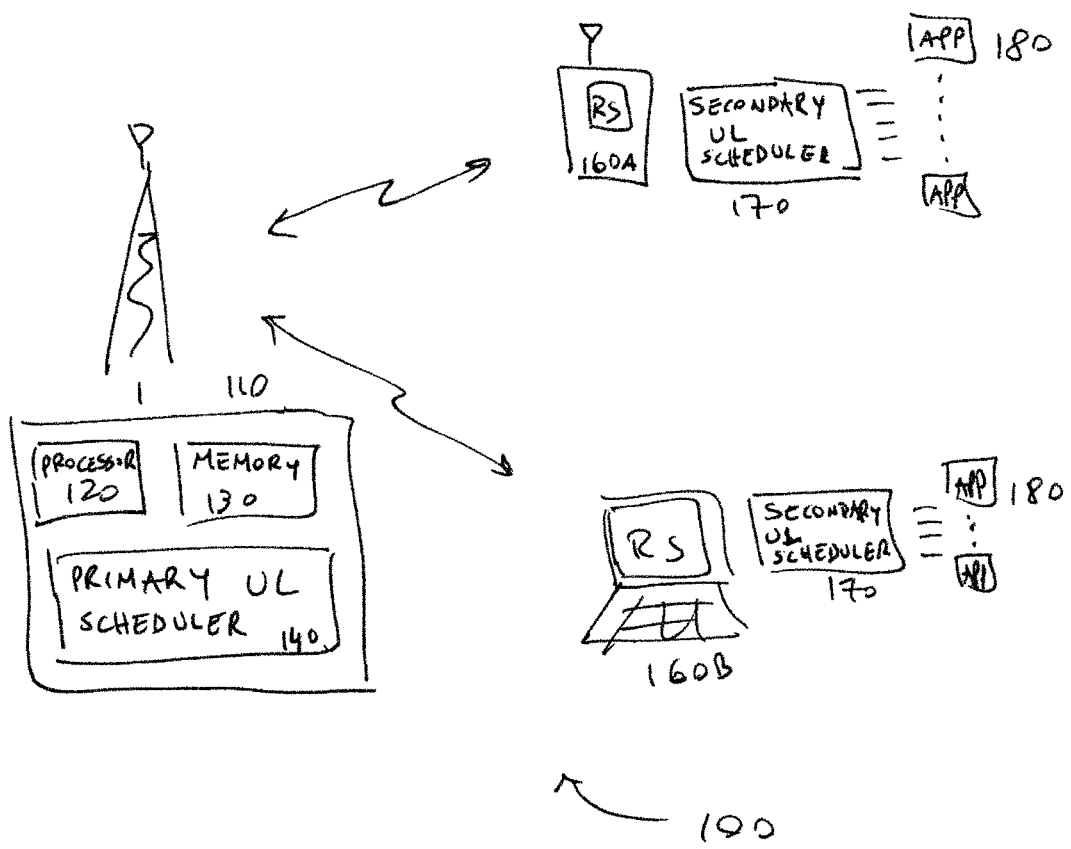
FIG. 1 depicts an exemplary block diagram illustrating a system according to embodiments of the present invention.

Embodiments of the invention are illustrated by way of example and not limitation in the figures of the accompanying drawings, in which like reference numerals indicate corresponding, analogous or similar elements. It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing," "analyzing," "checking," or the like, may refer to operation(s) and/or processes of a computer, a computing platform, a computing system, or other electronic computing device, that manipulate and/or transforms data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, or the like. For example, "a plurality of stations" may include two or more stations.

In the descriptions that follow, embodiments of the invention are described in connection with an orthogonal frequency division multiple access (OFDMA) system, such as used in IEEE 802.16 and LTE standards. However, it will be recognized that the present invention may be used in a variety of Point to Multipoint Broadband Wireless Systems in which a base station allocates uplink bandwidth to a plurality of remote stations based on request for uplink bandwidth from the remote stations.

In a Point to Multipoint Broadband Wireless System according to embodiments of the invention, remote stations may request allocations of uplink bandwidth from a base station with which they are in communication, in order to transmit data in the uplink direction. It will be understood that such requests for allocation of uplink bandwidth may arrive at any time. An uplink scheduler at the base station may allocate uplink bandwidth taking into account the scheduler type and the priority level within the same scheduler type of the service flows for which the requests are made. The scheduler types listed by order of priority are: Unsolicited Grant Service (UGS), Enhanced Real Time Polling Service (ERTPS), Real Time Polling Service (RTPS), Non Real Time Polling Service (NRTPS), and Best Effort (BE), where Best Effort is the lowest priority scheduler type but the most common one. A priority classifier is used to apply different priority level to different BE service flows. Bandwidth is allocated to BE service flows after bandwidth was allocated to satisfy the needs of the higher priority scheduler types outlined above. Accordingly, total available uplink bandwidth to be allocated for best efforts service requests from remote stations may be total uplink bandwidth minus the bandwidth allocated for service flows associated with the higher priority uplink scheduler types.

According to embodiments of the invention, an uplink best effort scheduler may fairly allocate remaining bandwidth of an uplink channel controlled by a base station among remote stations sending requests for such bandwidth. Such an uplink scheduler may be located at or within a base station and/or its functions may be distributed between a primary scheduler at the Base Station and a secondary scheduler at the remote station, as described below.

Reference is made to FIG. 1, which is a schematic illustration of a point to multipoint (PtMP) broadband wireless system 100 according to embodiments of the invention. The system may include one or more Base Stations 110 (BSs) and one or more remote stations 160a and 160b (RSs). Base station 110 may be configured to operate independently or in coordination with other base stations (not shown) within a geographic region, or sector. Remote stations may be mobile remote stations 160a or fixed location remote stations 160b. Base stations may serve as an access point to the remote station in a geographic region, or a sector. One or more base stations (for example, three base stations) may reside within a tower.

Base station 110 may include one or more processors 120 capable of performing the calculations and processing described herein, and one or more memories 130, for example, to store instructions and other data. Processor 120 may be a general-purpose processor operating software or instructions to perform the processes described herein, or a special-purpose processor for performing the processes. Base station 110 may include an uplink scheduler 140 (also referred to herein as a primary uplink scheduler), which may be a hardware or software module for performing the uplink bandwidth allocation according to embodiments of the invention. For example, processor 120 may modify content of symbols, subcarriers and/or slots of an orthogonal frequency division multiple access (OFDMA) signal or signal set, or other communication signals. It will be understood that base station 110 may include further elements not shown, in order to enable sending, receiving, and processing wireless communications to and from the remote stations. Processor 120 may command these other elements of BS 110 to participate in one or more communication links, for example, a transmitter, a receiver, an antenna, etc. (not shown). Processor 120 may be operably connected to a memory 130, which may store commands and/or instruction sets used by processor 120, and/or commands, instructions and/or data that may be used by a scheduler 140. Memory 130 may be any kind of suitable memory.

According to embodiments of the invention, primary uplink scheduler 140 may be part of the Media Access Control (MAC) layer of base station 110. Uplink Scheduler 140 may control allocation of air resources to remote stations for communication in the uplink direction, i.e., the RS to BS. Uplink Scheduler 140 may include a best effort (BE) scheduler, or be operable to execute commands of a BE scheduler algorithm, according to embodiments of the invention. Uplink Scheduler 140 may operate to allocate air resources among operably connected RSs fairly, for example, to avoid favorable treatment or priority of any RS over any other RS, for example, based on order of received requests for bandwidth allocation.

Primary uplink scheduler may allocate bulk air resources to the remote stations in a sector, and may support multiple scheduling modes, including, for example, Unsolicited Grant Services (UGS), Enhanced Real Time Polling Service (ERTPS), Real Time Polling Service (RTPS), Non Real Time Polling Service (NRTPS) and Best Effort (BE). The primary scheduler may allocate for BE service flows, outstanding air resources, e.g. allocated air resources minus air resources allocated to higher priority scheduling modes. Uplink Scheduler 140 may start by allocating priority requests for uplink bandwidth, e.g. unsolicited grant services (UGS), or other priority traffic, and then allocate remaining available uplink bandwidth for best efforts uplink communication, according to embodiments of the invention.

Remote stations 160a and 160b may be mobile stations or fixed location stations. Base station 110 may be in communication with one or more remote stations 160a and 160b, and such communication may be by a wireless or radio signal 150. Remote stations 160a and 160b may include a secondary scheduler 170 for sub-allocating uplink bandwidth resources received from the primary scheduler among multiple active applications or services 180 in the RS, according to embodiments of the invention. Secondary Uplink Scheduler 170 may receive packets which are classified into multiple services 180 within the RS, and may collect or aggregate the bandwidth needed to transmit such packets and generate an aggregate bandwidth request for each of the services, i.e., the bandwidth request includes the total required bandwidth for each of the services. The bandwidth requests are transmitted to BS 110. The secondary uplink scheduler may classify the packets into services based on parameters, for example header fields. Each of the services has one or more QOS parameters, which may be pre-defined. Secondary Uplink Scheduler 170 may aggregate the bandwidth per service, and send an aggregate bandwidth request for each service with outstanding packets not transmitted yet.

According to embodiments of the invention, transmission between a base station and remote stations within a sector may be fully controlled by the base station geographically covering the sector. Remote stations may transmit in the uplink direction when each one may receive an allocation of an "air resource". Embodiments of the invention may employ Orthogonal Frequency Division Multiple Access (OFDMA), for example, an air resource may have two dimensions, e.g. frequency and time. The frequency domain may be comprised of multiple carriers. The time domain may be divided into symbols. A collection of all eligible subcarriers for a sector, at a particular time may be referred to as an OFDMA symbol. Eligible subcarriers may be, for example, all subcarriers used in the respective OFDMA scheme, e.g., 128, 512 or 1024 sub-carriers, or one or more subsets of all subcarriers, that may be referred to as a "sub-channel".

Figure 2A:
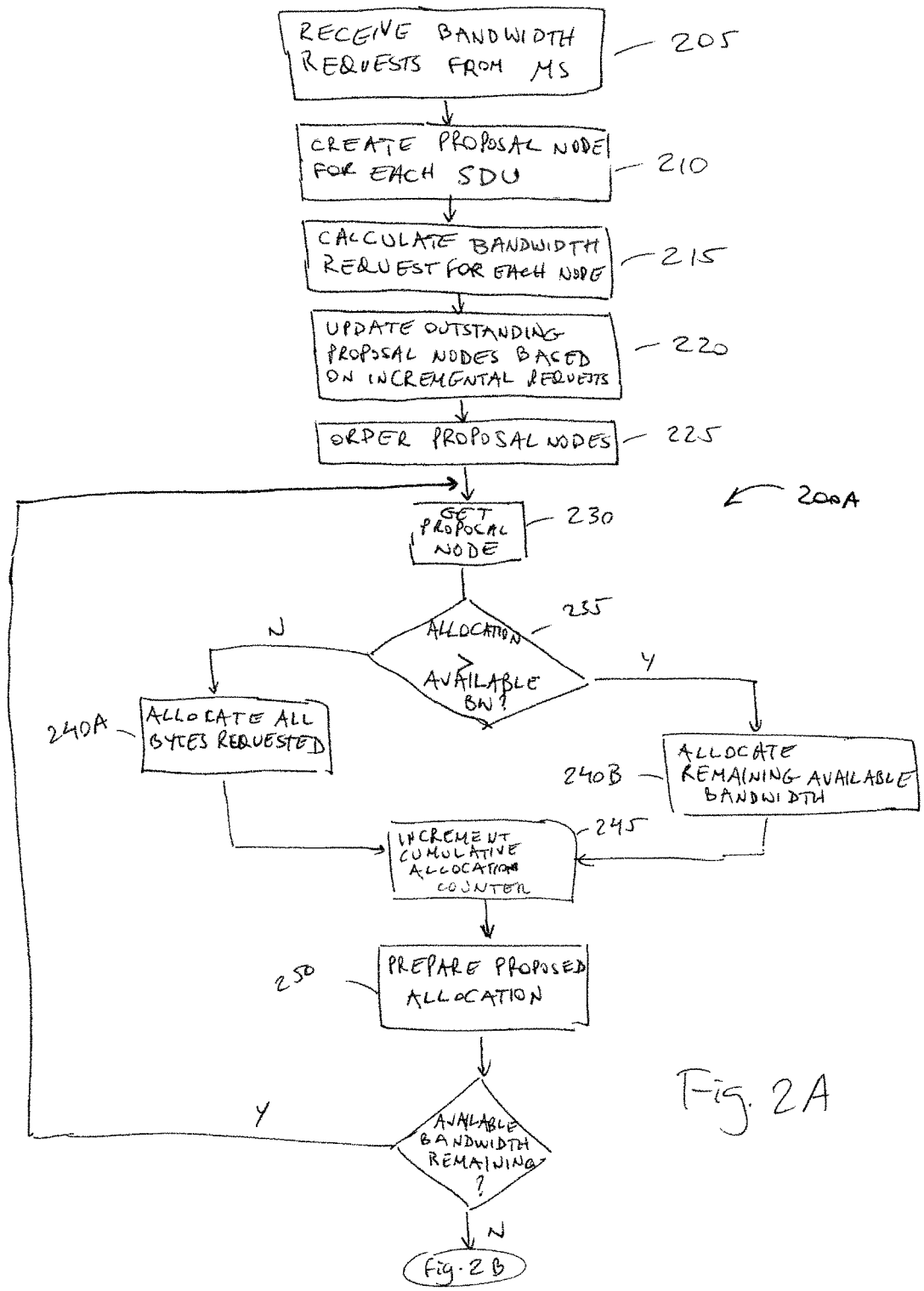
FIGS. 2A and 2B depict methods according to embodiments of the invention for allocation of uplink bandwidth by a primary scheduler.
Figure 2B:
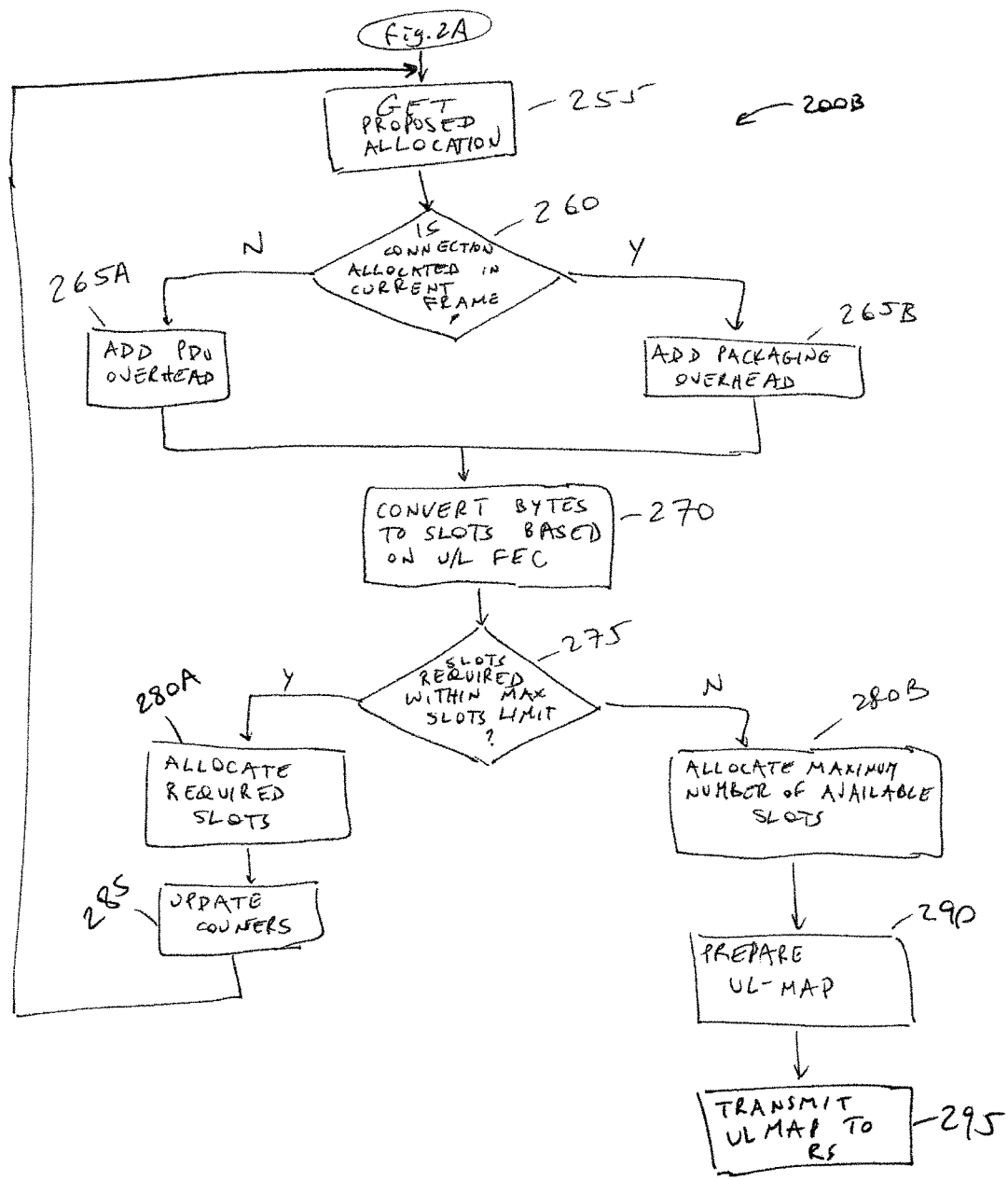

Reference is made to FIGS. 2A and 2B, which illustrate schematic flow diagrams 200A and 200B of a best efforts allocation algorithm performed by a primary scheduler at a base station in accordance with an embodiment of the invention.

FIG. 2A illustrates a portion of the scheduling representing conversion of proposal nodes to proposed allocations. The primary scheduler may receive a plurality of bandwidth requests from the mobile stations (205). It will be understood that each such bandwidth request may be an aggregate request, that is, each bandwidth request contains the total outstanding bandwidth required for each of the services at one of the remote stations. As such, the aggregate bandwidth requests contains the bandwidth needed to transmit packet which arrived at the RS at different instants. The primary scheduler at the BS may convert the aggregate bandwidth request into a list of non-aggregate request, which may be posted in the proposal node list. In this manner, the order of nodes in the proposal node list may maintain the time of arrival of the individual packets, thereby maintaining fairness in the bandwidth allocation process. The BS may allocate bandwidth to the remote stations as per their requests, and subject to bandwidth availability. Upon receipt of uplink bandwidth allocations from the base station, the remote station secondary scheduler may typically use the allocations for the original services for which they were requested; however, in some instances, the secondary scheduler may re-allocate the allocations differently. This flexibility gives the secondary scheduler at the remote station the ability to reallocate the bandwidth to a newly received higher priority service packet that arrived, but for which bandwidth has not been requested or received.

The primary scheduler may create a proposal node for each service data unit (SDU) at the RS (210). In some embodiments of the invention, the Typically, the primary scheduler may first convert the respective aggregate bandwidth request into a list of differential bandwidth requests, one per SDU, prior to creating the proposal node. It will be understood that the proposal node may be implemented in a variety of ways, for example, a record in a data structure, having a plurality of fields.

In some embodiments of the invention, a new proposal nodes may added to the list of existing proposal nodes as described herein. Upon receiving a new aggregate bandwidth request from a remote station for a certain service, the primary scheduler, e.g., at the BS, may calculate the total bandwidth of all proposal nodes for the same service and subtract the total from the bandwidth of the new aggregate request (215). The value of the difference may represent the bandwidth associated with the new proposal node. It will be understood that remote stations may have previously requested allocation of uplink bandwidth. Therefore, the primary scheduler will look to the outstanding proposal nodes of each remote station and determine whether the new allocation request exceeds the prior allocation. The proposal node may be updated with this incremental bandwidth request (220).

The primary scheduler may then consider and process the proposal nodes. Because there may frequently be limited uplink bandwidth available for best efforts services, the requests may exceed available bandwidth. For this reason, the order of consideration of the proposal nodes may be important. The primary scheduler may order the proposal nodes for consideration (225), for example, based on priority, time or arrival, and other parameters.

Prior to allocating available bandwidth, a cumulative counter representing the total allocation (bytes_allocated) may be initialized to zero. The primary scheduler may then perform an iterative process to convert proposal nodes into proposed allocations based on the determined order of the proposal nodes. As described above, the primary scheduler may initially calculate the amount of uplink bandwidth available for allocation to best efforts requests as the maximum uplink frame capacity (MUFC). The iterative process may therefore continue until all available bandwidth has been allocated, i.e., until an additional allocation would cause bytes_allocated to exceed MUFC.

The primary scheduler may get a proposal node from the list (230), and consider whether the allocation requested by the proposal node are greater than the available bandwidth, i.e., bytes_requested>MUFC—bytes_allocated (235). If not, i.e., if there is sufficient bandwidth available for the request, then the proposal node is converted into a proposed allocation of the entire bandwidth request: the allocated bandwidth of the proposed allocation (allocbytes) is set to the entire request of the proposal node (bytes_requested) (240A); the cumulative allocation counter (bytes_allocated) is incremented by the allocated bandwidth (allocbytes) (245); and a proposed allocation is prepared and input to the ARM scheduler (250). If there is available bandwidth remaining, the loop is repeated for the next proposal node from the list.

At decision node 235, if the allocation requested by the proposal node are greater than the available bandwidth, i.e., bytes_requested>MUFC—bytes_allocated, then the proposal node is converted into a proposed allocation of a portion of the bandwidth request: the allocated bandwidth of the proposed allocation (allocbytes) is set to the remaining bandwidth available (allocbytes=MUFC—bytes_allocated) (240B); the cumulative allocation counter (bytes_allocated) is incremented by the allocated bandwidth (allocbytes) (245); and a proposed allocation is prepared and input to the ARM scheduler (250). Because this branch is reached when there is no remaining bandwidth available, there will be no available bandwidth remaining, and the flow proceeds to the ARM scheduler based on the list of proposed allocations, each having a bandwidth allocation (allocbytes).

FIG. 2B illustrates a portion of the scheduling representing preparation of the uplink allocation map (ULMAP) to be transmitted to the remote stations. According to an embodiment of the invention, this process may be performed by a module or sub-module in the base station referred to as the ARM scheduler. It will be recalled that the bandwidth in the proposal nodes was incremental with respect to the current frame. Accordingly, the ULMAP should reflect the current allocations, as well as proposed incremental allocations. The uplink allocation map is prepared in an iterative process based on the list of proposed allocations created by the process in FIG. 2A. The ARM scheduler gets the first proposed allocation (255), and considers whether the current frame already includes an allocation to the particular remote station connection (260). If not, then the new connection will require additional protocol data unit (PDU) overhead, and the bytes for the additional PDU overhead are added to the bandwidth request (265A). If the current frame already includes an allocation to the particular remote station connection, then the new bandwidth may be concatenated with the previous allocation, and the bytes for packing overhead are added to the bandwidth request (265B).

The total data and overhead bytes of the proposed allocation are then converted to slots using the relevant uplink forward error correction (UL FEC) code for the particular remote station connection (270). The ARM scheduler then considers whether the slots required for the proposed allocation are within the configured maximum uplink slots limit (275). If so, then the requested slots are allocated (280A), the number of available slots is updated (285), and the process is repeated for the next proposed allocation. If the slots required for the proposed allocation are not within the configured maximum uplink slots limit, then the proposed allocation is given the maximum number of possible slots (280B), and because there are no remaining slots, the ULMAP message is prepared (290) and transmitted to the remote stations (295).

A secondary schedule in the mobile station receiving the ULMAP message may distribute the bandwidth allocation. Secondary uplink scheduler may distribute air resources allocated by a base station to various services requiring or requesting uplink resources. The remote station may classify the services and assign them priority, and may apply different quality of service parameters to each of these flows. The secondary scheduler receives the ULMAP message from the base station, which includes the bandwidth and slots allocated to the particular remote station. The uplink services within the remote station are arranged in order of priority. The secondary scheduler distributes the uplink bandwidth that was allocated by the BS to the services according to their order of priority, e.g., by scheduler type and by priority within the scheduler type. If the total bandwidth allocation is less than or equal to the total available bandwidth, then all the outstanding bandwidth for the service is served. If the total bandwidth allocation exceeds the total available bandwidth, then the secondary scheduler distributes the bandwidth to services in order of priority, etc., and may append any unmet bandwidth request to subsequent request for uplink bandwidth.

According to some embodiments of the invention, the secondary scheduler may manipulate packets and/or their metadata based on the received uplink bandwidth allocation map. For example, the secondary scheduler may concatenate packets received from a plurality of services having the same service priority level and transmit them in a single slot allocated to the remote station in the uplink bandwidth allocation map. Similarly, according to some embodiments of the invention, the secondary scheduler may fragment a single packet received from a particular service into a plurality of sub-packets, and transmit the sub-packets in a plurality of slots allocated to the remote station in a respective plurality of received uplink bandwidth allocation maps.

It will be understood that the algorithms above are embodiments of the invention, and that the invention may be performed using similar techniques. Furthermore, although embodiments of the invention above have been described in connection with an IEEE 802.16 standard, other embodiments of the invention may be used in conjunction with other suitable wired or wireless networks, such as a Local Area Network (LAN), a Wireless LAN (WLAN), a Metropolitan Area Network (MAN), a wireless MAN (WMAN), a Wide Area Network (WAN), a Wireless WAN (WWAN), devices and/or networks operating in accordance with existing IEEE 802.16, 802.16d, 802.16e, 802.11a, 802.11b, 802.11g, 802.11n standards and/or future versions and/or derivatives and/or Long Term Evolution (LTE) of the above standards, a Personal Area Network (PAN), a Wireless PAN (WPAN), units and/or devices which may be part of the above WLAN and/or PAN and/or WPAN networks, one-way and/or two-way radio communication systems, cellular radio-telephone communication systems, a cellular telephone, a wireless telephone, a Personal Communications Systems (PCS) device, a PDA device which may incorporate a wireless communication device, a Single Input Single Output (SISO) transceiver, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example Radio Frequency (RF), Infra Red (IR), Frequency-Division Multiplexing (FDM), Orthogonal FDM (OFDM), Orthogonal Frequency Division Multiple Access (OFDMA), Time-Division Multiplexing (TDM), Time Division Multiple Access (TDMA), Extended TDMA (E-TDMA), General Packet Radio Service (GPRS), Extended GPRS, 3G systems (Code-Division Multiple Access (CDMA), Wideband CDMA (WCDMA), CDMA 2000), 4G systems (LTE, WiMAX) Interim Standard 95 (IS-95), Multi-Carrier Modulation (MCM), Discrete Multi-Tone (DMT), Bluetooth®, ZigBee™, or the like. Embodiments of the invention may be used in various other apparatuses, devices systems and/or networks.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method for best effort uplink scheduling of air resources in a point to multipoint network comprising:
   receiving a plurality of requests for uplink bandwidth from a respective plurality of remote stations;
   creating a proposed allocation list comprising a plurality of proposal nodes, wherein each said proposal node is based on a request for uplink bandwidth and associated with an incremental bandwidth request over a prior bandwidth request for that remote station and a priority parameter;
   ordering the proposal nodes in said proposed allocation list based at least on said priority parameter and time of arrival of said requests for uplink bandwidth to produce an ordered proposed allocation list;
   distributing bytes of available uplink bandwidth among at least some of the proposal nodes based on their order in said ordered proposed allocation list, thereby creating a plurality of proposed allocations;
   allocating available slots to at least some of the proposed allocations based on data and overhead requirements, thereby creating an uplink bandwidth allocation map; and
   transmitting said uplink bandwidth allocation map to said remote stations.

2. The method of claim 1, further comprising:
   transmitting the plurality of requests for uplink bandwidth from a plurality of remote stations, respectively, wherein each of said requests comprises an aggregate for each of said remote stations of a plurality of outstanding demands for uplink bandwidth.

3. The method of claim 2, wherein said plurality of outstanding demands for uplink bandwidth comprise demands from a plurality of services associated with each said remote station.

4. The method of claim 2, wherein said plurality of outstanding demands for uplink bandwidth comprise previously transmitted demands for uplink bandwidth that have not been allocated.

5. The method of claim 1,
   wherein each said proposal node associated with a time of arrival of an associated request for uplink bandwidth, and
   wherein ordering the proposal nodes in said proposed allocation list is further based on said time of arrival of each proposal node.

6. The method of claim 1, further comprising:
   receiving said uplink bandwidth allocation map at a remote station;
   distributing portions of slots allocated to said remote station to a plurality of services operating on said remote station based on a service priority level associated with each of said services.

7. The method of claim 6, further comprising:
   concatenating packets from a plurality of services having the same service priority level into a single slot allocated to the remote station in said uplink bandwidth allocation map.

8. The method of claim 6, further comprising:
   fragmenting a packet from a single service into a plurality of sub-packets; and
   transmitting said sub-packets in a plurality of slots allocated to the remote station in a respective plurality of received uplink bandwidth allocation maps.

9. A system for best effort uplink scheduling of air resources in a point to multipoint network comprising:
a base station processor capable of:
receiving a plurality of requests for uplink bandwidth from a respective plurality of remote stations;
creating a proposed allocation list comprising a plurality of proposal nodes, wherein each said proposal node is based on a request for uplink bandwidth and associated with an incremental bandwidth request over a prior bandwidth request for that remote station and a priority parameter;
ordering the proposal nodes in said proposed allocation list based at least on said priority parameter and time of arrival of said requests for uplink bandwidth to produce an ordered proposed allocation list;
distributing bytes of available uplink bandwidth among at least some of the proposal nodes based on their order in said ordered proposed allocation list, thereby creating a plurality of proposed allocations;
allocating available slots to at least some of the proposed allocations based on data and overhead requirements, thereby creating an uplink bandwidth allocation map; and
transmitting said uplink bandwidth allocation map to said remote stations; and
a plurality of remote station processors capable of:
aggregating a plurality of outstanding demands for uplink bandwidth; and
transmitting a request for uplink bandwidth based on said aggregate of outstanding demands for uplink bandwidth.

10. The system of claim 9, wherein said plurality of outstanding demands for uplink bandwidth comprise demands from a plurality of services associated with each said remote station.

11. The system of claim 9, wherein said plurality of outstanding demands for uplink bandwidth comprise previously transmitted demands for uplink bandwidth that have not been allocated.

12. The system of claim 9,
wherein each said proposal node associated with a time of arrival of an associated request for uplink bandwidth, and
wherein ordering the proposal nodes in said proposed allocation list is further based on said time of arrival of each proposal node.

13. The system of claim 9, wherein the remote station processor is further capable of:
receiving said uplink bandwidth allocation map;
distributing portions of slots allocated to the remote station to a plurality of services operating thereon based on a service priority level associated with each of said services.

14. The system of claim 13, wherein the remote station processor is further capable of:
concatenating packets from a plurality of services having the same service priority level into a single slot allocated to the remote station in said uplink bandwidth allocation map.

15. The system of claim 13, wherein the remote station processor is further capable of:
fragmenting a packet from a single service into a plurality of sub-packets; and
transmitting said sub-packets in a plurality of slots allocated to the remote station in a respective plurality of received uplink bandwidth allocation maps.

* * * * *